(12) United States Patent
Zillante et al.

(10) Patent No.: US 10,788,146 B2
(45) Date of Patent: Sep. 29, 2020

(54) SYSTEMS AND METHODS FOR UNDERGROUND PIPE INSTALLATION AND SOIL CLEARING

(71) Applicant: Zilper Trenchless, Inc., Cambridge, MA (US)

(72) Inventors: Roberto Antonio Zillante, Bogota (CO); Daniel Antonio Zillante, Cambridge, MA (US)

(73) Assignee: Zilper Trenchless, Inc., Cambridge, MA (US)

( * ) Notice: Subject to any disclaimer, the term of this patent is extended or adjusted under 35 U.S.C. 154(b) by 0 days.

(21) Appl. No.: 16/707,530

(22) Filed: Dec. 9, 2019

(65) Prior Publication Data

US 2020/0158262 A1 May 21, 2020

Related U.S. Application Data

(63) Continuation of application No. 16/270,913, filed on Feb. 8, 2019, now Pat. No. 10,539,254.

(Continued)

(51) Int. Cl.
*F16L 1/036* (2006.01)
*E21B 19/086* (2006.01)
*E21B 7/04* (2006.01)
*E21D 9/00* (2006.01)
(Continued)

(52) U.S. Cl.
CPC ............... *F16L 1/036* (2013.01); *E21B 1/02* (2013.01); *E21B 7/046* (2013.01); *E21B 7/20* (2013.01);
(Continued)

(58) Field of Classification Search
CPC .......... F16L 1/036; E21B 7/205; E21B 7/046; E21B 7/20; E21D 9/005; E21D 9/06
See application file for complete search history.

(56) References Cited

U.S. PATENT DOCUMENTS

| 3,952,813 A | 4/1976 | Chepurnoi et al. |
| 4,013,134 A | 3/1977 | Richmond et al. |

(Continued)

FOREIGN PATENT DOCUMENTS

| CN | 2329707 Y | 7/1999 |
| CN | 106917629 A | 7/2017 |
| DE | 3513578 | * 3/1986 |

OTHER PUBLICATIONS

International Application No. PCT/US2019/017198 Form PCT/ISA/210 International Search Report dated Jun. 24, 2019 (18 pages).

*Primary Examiner* — Sean D Andrish
(74) *Attorney, Agent, or Firm* — Proskauer Rose LLP

(57) ABSTRACT

Systems and methods for installing pipe underground are disclosed. The system includes a pneumatic rammer configured to provide a percussive force to a section of pipe. The system also includes a main jacking frame coupled to the pneumatic rammer, the main jacking frame including a surface for contacting the section of pipe. The system also includes one or more hydraulic jacks coupled to the main jacking frame and configured to provide a hydraulic force to the section of pipe. The system also includes a set of tracks coupled to the main jacking frame, the set of tracks permitting the main jacking frame to slide in a longitudinal direction. An independently displaceable soil-clearing system can be included to clear dirt coming inside the pipe during the installation and add extra jacking force as needed.

20 Claims, 12 Drawing Sheets

Related U.S. Application Data

(60) Provisional application No. 62/629,865, filed on Feb. 13, 2018.

(51) Int. Cl.
 *E21B 7/20* (2006.01)
 *E21B 1/02* (2006.01)

(52) U.S. Cl.
 CPC ............ *E21B 7/201* (2013.01); *E21B 19/086* (2013.01); *E21D 9/005* (2013.01)

(56) References Cited

U.S. PATENT DOCUMENTS

| | | | |
|---|---|---|---|
| 4,553,612 A | 11/1985 | Durham | |
| 4,671,703 A | 6/1987 | Schmidt | |
| 4,691,788 A | 9/1987 | Yoshida et al. | |
| 4,738,565 A | 4/1988 | Streatfield et al. | |
| 5,076,731 A | 12/1991 | Luksch | |
| 5,192,165 A | 3/1993 | Torielli | |
| 5,302,053 A | 4/1994 | Moriarty | |
| 5,403,122 A | 4/1995 | Granella | |
| 5,456,552 A | 10/1995 | Cherrington | |
| 5,480,263 A | 1/1996 | Kayes | |
| 5,482,404 A | 1/1996 | Tenbusch, II | |
| RE35,271 E | 6/1996 | Fisk et al. | |
| 5,628,585 A | 5/1997 | Parish, II et al. | |
| RE35,542 E | 6/1997 | Fisk et al. | |
| 5,919,005 A * | 7/1999 | Rupiper | B09C 1/00 175/323 |
| 6,652,190 B1 | 11/2003 | Verkyk | |
| 2016/0333642 A1 | 11/2016 | Bachand et al. | |
| 2017/0342776 A1 | 11/2017 | Bullock et al. | |

* cited by examiner

SYSTEMS AND METHODS FOR UNDERGROUND PIPE INSTALLATION AND SOIL CLEARING

RELATED APPLICATION

This application is a continuation of U.S. patent application Ser. No. 16/270,913, filed Feb. 8, 2019, which claims the benefit of U.S. Provisional Patent Application No. 62/629,865, filed on Feb. 13, 2018 and entitled "Trenchless Pipeline Installation Method and Apparatus," the entire contents of which are hereby incorporated by reference in their entirety.

TECHNICAL FIELD

The invention relates generally to systems and methods for installing underground sections of pipe, including pipeline, gas mains, water and sewer lines, utility conduits and other utilities. More specifically, the invention relates to trenchless underground pipe installation, for example using tools and methods that are suitable to install new pipes using one or more of a hydraulic jacking force, pneumatic percussive impacts, and a dirt-extraction process of soil coming inside the pipe during installation.

BACKGROUND

Various applications require the installation of underground pipes between two stations, such as between two manholes or the two sides of a highway, without creating a trench between them.

Several prior techniques have been developed to accomplish trenchless installation of carrier pipes (also known as product pipes) or protective tubular casings (normally steel casings). Most of these methods are based on a static pushing force applied to the pipe against the ground; that is, pipes or casings are jacked through the ground by means of a hydraulically operated jacking unit from a previously prepared starting or entry shaft to a target shaft. In general, all of these pipe jacking-based installations (e.g., horizontal auger boring machines, guided boring machines, and micro-tunneling machines, among others) require a rotating shield or cutting head at the front of the first pipe, in order to cut the ground in front of it, as well as a system to transport the spoils to the starting pit. Moreover, all these methods have in common the need for large and powerful hydraulic jacks to overcome not only the skin friction of the pipes being installed, but also an extra penetration force in order to be able to cut the ground in front of the cutting head.

One case of an auger boring machine is presented in U.S. Pat. No. 4,013,134 (see FIG. 1). In general, the machine 100 comprises a base 101 that includes spaced track members, which are disposed in a trench adjacent to the hill to be bored. The machine also includes a frame mounted for movement along the track means 102, and such carriage 103 supports a power train for rotating connected sections of auger shafts 104, which comprise a progressively extendable boring auger. The frame supports a pusher ring 105 for driving sections of casings into the bored hole, and an associated pushing cylinder is provided for advancing and retracting the frame and pusher ring along the track.

One disadvantage of this type of machine relies on the need for a complete set of augers (at least same length of the total drive) with a similar diameter of the pipe to be installed in order to drag the soil coming from the cutting head to the jacking pit or entry shaft. Therefore, if a different project requires the installation of pipes of a different diameter, in most of the cases, the whole auger set has to be purchased again. Another disadvantage of using a continuous auger is the high torque requirements of this type of system. The high torque increases the chances of injury or death for people working close to the machine since there is a risk that the machine will flip on its side when facing tough grounds, smashing anything or anyone close to it. The high torque requirements are a consequence of the torque needing to cut the natural ground in front of the cutting head, the energy required to move the whole set of augers inside the steel casings, and/or the torque needed to drag the spoils along all the installed pipes. This continuous auger-based spoil extraction system produces the drag of spoils as a reaction produced by the spinning of those augers surrounded by the dirt. In this process, a considerable part of the energy is lost by friction and by the radial force component resulting between the ground and the augers. Another issue with this method is that, in shallow installations or sandy soils, there is a risk of generating a sinkhole.

Other trenchless methods are related to micro-tunneling machines. Such systems involve a whole family of machines with some variations among them. Many of the variations differ on how the soil is excavated and how the spoils are transported to the surface of the jacking shaft. In general terms, they include a boring shield that is pushed forward by the product pipes behind it, which are being jacked by large and robust hydraulic jacks in the launch pit. As these micro-tunnel boring machines move forward through the ground, the soil is removed by typically mixing it with a fluid, to then pump the mixture out of the tunnel into a separation plant, wherein the solids are separated from the fluids. An alternative way to transport the excavated soil is by the means of a short auger located just behind of the cutting shield, filling bucket carts that are continuously moving back and forward inside the tunnel, and carrying out the excavated material. These methods do not always work well in shallow applications, depending on soil type. In addition, tunnel boring tends to be slow and expensive because of the type of equipment required, and because the cutting shield is specially manufactured or selected based on the specifications of each project (e.g., a diameter of the pipe and ground conditions).

Alternatively, other methods are based on percussive impacts for ramming steel pipes into the ground rather than using static jacking forces. In most of these cases, these steel pipes mostly are protective pipes for accommodating the final carrier pipes inside of them. Normally, these impact-based methods have an open-end cutting edge at the front of the first pipe to let the ground coming in. Once the installation is completed, a procedure starts to mechanically, hydraulically, pneumatically or manually extract the ground inside the pipe. One example of an impact-based method is the Paul Schmidt, U.S. Pat. No. 4,671,703 (e.g., as shown in FIG. 2)

In one conventional approach to pipe ramming 200, a percussive pneumatic hammer 201 is used to drive the pipe 202 horizontally or at an angle into the ground. The hammer's housing is attached to the end of the pipe by means of a suitable fitting 203 and is sometimes further secured by cables. A piston-actuated ram strikes a plate inside the housing and the percussive force is transmitted to the end of the pipe through the housing, thereby causing the pipe to advance into the ground. Pneumatic rammers are characterized by producing several blows per minute, delivering low to medium energy on each blow. A typical small pneumatic hammer offers 0.17 kJ of energy and delivers 580 blows per minute, weighing less than 10 kg. A typical large hammer has 40 kJ of energy, weighs 12 metric tons and delivers 180 blows per minute.

Hydraulic (rather than pneumatic) hammers are often used in vertical drilling. This type of large hammers generally operates at fewer strokes per minute but delivers much more per blow. In this case, the strike piston extends outside the hammer housing to strike the casing. Typically, one hydraulic hammer weighs 4 metric tons, delivers 65 blows per minute at 30 kJ, while a 242 metric ton hammer delivers 2300 kJ at 30 blows per minute. In vertical drilling, the hammer housing is maintained in contact against the casing principally by means of gravity. Even if they are not commonly used for horizontal pipe ramming, they are an alternative when installing large casing diameters. However, because the ram extends outside the hammer housing, it is not practical to secure the housing to the pipe. It therefore becomes essential to provide crowd of the hammer against the pipe. One approach 300 to doing so is disclosed by Verkyk, U.S. Pat. No. 6,652,190, which relies on a cable winch crowd system 301 (see, e.g., FIG. 3A).

A recent improvement 302 of the Verkyk invention is disclosed by U.S. Patent Pub. No. 2016/0333642 to Bachand et al, in which the winch-based crowd is substituted by a carriage that is urged forward by hydraulic cylinders acting between the carriage and an abutment (see, e.g., FIG. 3B). A compressive resilient assembly is mounted on the carriage 303 in order to release its energy to the hydraulic hammer 304 to keep it in contact with the pipe 305 after each impact. Since this technology employs a hydraulic hammer, the space requirements for the entry pit will be considerably larger than the space needed for other trenchless techniques, making this machine suitable mostly to large diameter installations (e.g., pipes over 72 inches in diameter), like in the case of its predecessor (Verkyk, U.S. Pat. No. 6,652, 190). Another deficiency of the Bachand publication is that the penetration is essentially generated by the hammer's impacts. In such a case, the hydraulic force is used to keep the large hydraulic hammer in place (attached to the pipe) and not to counteract the natural pipe elasticity or to notably increase the penetration force. Furthermore, due to the high-energy impact peaks generated by the hydraulic hammer, it is impractical to apply high static force to the pipe since this will lead to the use of considerable thicker steel casings to avoid damages in the pipe.

Regardless the type of rammer used, one common problem with percussive pipe ramming methods (including Bachand) is that the soil-clearing process cannot be done at the same time with the installation process, leading to a reduction in overall productivity. Another common problem is the need of relatively high energy quantities (big hammers) to install the pipes or casings since a considerable part of the energy of each impact is lost. One relevant part of the energy is absorbed by the natural steel pipe elasticity, and the pipe's external and internal skin friction (from the soil coming inside) dissipates another important part of the energy. Additionally, due to the momentum transferred from the rammer to the pipe, the extra mass added to the pipe due to the soil coming inside it during operation diminishes the acceleration of the cutting edge, reducing the penetration force in the front of the first pipe. All of these undesired effects are magnified as the length of the drive increases, limiting this method to be useful only for relatively for short drives (normally less than 300 feet).

Furthermore, all of the above trenchless methods have their own limitations and applicability depending on the length, diameter, precision requirements and ground conditions. Moreover, all these machines are designed to overcome the maximum length and diameter in which they were preconceived, even if that means to be overpowered for shorter drives or smaller diameters. Finally, most of the machines listed above (especially pipe jacking-based methods) have their main parts specifically dimensioned for a specific pipe diameter, and every time a new diameter has to be installed, a significant investment has to be made in a new custom part.

SUMMARY

It is an object of some embodiments of the present invention to provide a method and apparatus for installing pipe sections (e.g., steel casings), or installing new product pipelines, without trenching the ground between two pits or shafts. It is further an object of the present invention to provide a versatile method for trenchless installations of new pipes, while being capable of reaching a wide range of diameters (e.g., up to 72 inches) and soil conditions, especially risky ground conditions for many of the current technologies. Some of these tough conditions include unstable soils (e.g., cobble), sandy or granular soils with presence of ground water, or highly heterogeneous soils along the drive.

The features of some embodiments of the present invention conglomerate the advantages of some known trenchless techniques. In one embodiment of this invention, a hydraulic jacking frame compresses and pushes the steel pipes against the ground with a constant force, while percussion impacts coming from a pneumatic rammer generate additional penetration force to move forward the pipes into the ground. The open-ended pipe in the front lets the soil come inside it, while an independent linear displaceable soil-clearing system progressively removes the dirt while the installation progresses, reducing the total moving mass during the installation, and consequently augmenting the effectiveness of the impacts. Since the open-ended pipe has minimal contact area with the ground in front of it, the cutting edge allows the soil to enter into the pipe with low requirements of penetration force, unlike in the case of apparatus with rotational cutting heads in front of the first pipe. The impact force applied is maximized since constant hydraulic force minimizes energy losses caused by the pipe bounce back (due to the natural pipe's elasticity), while adding force to overcome the skin friction of the pipe or casing. The pneumatic rammer generates lower energy peaks compared to a hydraulic hammer, at a higher frequency (e.g., from 160 to 580 blows per minute), and these lower energy peaks allow applying a higher static force to the pipes without the need to use thicker steel pipes.

In one embodiment, the main jacking frame comprises hydraulic cylinders acting on a rail-mounted pusher plate in which the percussive pneumatic rammer is firmly attached by means of a suitable fitting. The pusher plate works as a device for combining the impacts and the static force in order to transform that energy into penetration force for the pipes in front of it, while maintaining the pipe at the desired alignment. The fitting of the hydraulic rammer is slightly eccentric with respect to the pipe's centerline in order to let the clearing rods (which are aligned to the centerline) pass through a window in the pusher plate to clear the dirt inside the pipes.

In another embodiment, the soil-clearing system includes clearing rods, at least one auger section, and a linear displaceable frame carrying a hydraulic motor on it. This frame is mounted on the same main jacking system's rails but with an independent set of hydraulic actuators for going forward and backward along those rails or tracks. The dirt-extraction system of this invention differs from existing auger-based methods since, instead of dragging the dirt using only the rotation of a continuous auger set, the system uses the rotation (while going forward) of a few equally-distanced auger segments only to capture the soil inside the pipe like the analogical case of a wine-bottle opener capturing a bottle's cork. Then, the segmented augers are pulled back with the dirt by using hydraulic jacks; this is an axial energy-efficient process like in the analogical scenario of a standard wine-bottle opener using its arms to extract a bottle's cork instead of using rotation only. This process is progressively repeated in such a manner that each auger leaves behind the dirt after retracting the system, and then starts again going forward (while rotating) in order to collect the dirt left behind by the following auger segment. Note that the bigger the separation between auger segments is, the longer the displacement of the whole clearing system is to perform this coordinated task. As an alternatively embodiment, this soil-clearing system can be substituted by a continuous auger driven by a bigger hydraulic motor fixed at the main jacking frame, like a standard auger boring machine. This last configuration can require more torque and may need to replace the whole auger set every time the diameter of the pipe changes, instead of changing just a few auger segments. In some embodiments, the soil clearing system can include at least one clearing rod with one auger section, or alternatively, just one auger section attached directly to the hydraulic motor.

Another feature of the present invention is the power optimization capability in which the independent linear displaceable soil-clearing system is used for generating a supplementary hydraulic jacking force, only when extra pushing force is needed. That is, pushing, with their own hydraulic cylinders, the main jacking frame to increase the total pushing force in order to overcome obstacles, high skin friction of long drives, or hard soil conditions. The extraction of the excavated material is temporarily suspended when the clearing-soil system is used for pushing the jacking frame.

In one aspect, the invention features a system for installing pipe underground. The system includes a pneumatic rammer configured to provide a percussive force to a section of pipe. The system also includes a main jacking frame coupled to the pneumatic rammer, the main jacking frame including a surface for contacting the section of pipe. The system also includes one or more hydraulic jacks coupled to the main jacking frame and configured to provide a hydraulic force to the section of pipe. The system also includes a set of tracks coupled to the main jacking frame, the set of tracks permitting the main jacking frame to slide in a longitudinal direction.

In some embodiments, the system further includes a soil-clearing system having a base frame coupled to the set of tracks. The soil-clearing system is configured to extract dirt from inside the section of pipe during underground installation of the section of pipe. The base frame is slideable over the set of tracks independent of the main jacking frame. In some embodiments, the soil-clearing system includes a rod-auger assembly driven by a hydraulic motor or another rotating actuator to drag dirt during operation. In some embodiments, the main jacking frame includes a pusher plate having at least one window to permit passage of dirt by the soil-clearing system.

In some embodiments, the soil-clearing system includes at least one clearing rod, at least one auger section attached to the clearing rod, and an axially displaceable rail-mounted frame attached to the clearing rod, the rail-mounted frame carrying a hydraulic motor. In some embodiments, the rail-mounted frame moves forward and backward along the longitudinal direction by means of at least one hydraulic cylinder acting between the rail-mounted frame and a locking system. In some embodiments, the at least one clearing rod, the at least one auger section, and the axially displaceable rail-mounted frame are configured to extract dirt from sequential sections of pipe. In some embodiments, the pneumatic rammer is a high frequency rammer from 160 to 580 blows per minute. In some embodiments, the section of pipe is steel. In some embodiments, the steel pipe acts as a steel casing for carrying other pipes inside. In some embodiments, the section of pipe has a diameter of 72 inches or less.

In another aspect, the invention features a method for installing pipe underground. The method includes compressing, by a main jacking frame coupled to a set of tracks and assisted by at least one hydraulic cylinder, a section of pipe against a ground surface. The method also includes generating, by a pneumatic rammer attached to the main jacking frame, a percussive impact for advancing the section of pipe into the ground. The method also includes pushing, by the jacking frame and the pneumatic rammer, the pipes into the ground.

In some embodiments, the method further includes extracting, using a soil clearing system coupled to the set of tracks, dirt from inside the section of pipe during installation of the section of pipe, the soil clearing system moveable with respect to the main jacking frame. In some embodiments, the main jacking frame includes a pusher plate having at least one window to permit passage of dirt by the soil-clearing system. In some embodiments, the method further includes employing a hydraulic force to pre-compress the section of pipe to counteract an elasticity of the section of pipe to promote efficient energy transmission from the pneumatic rammer through the section of pipe.

In some embodiments, a constant force is applied against the ground by the jacking frame. In some embodiments, the method further includes, after the section of pipe is installed underground, joining one or more additional sections of pipe to the section of pipe to form an underground tunnel between an entry point under the ground surface and a target pit. In some embodiments, the pneumatic rammer is a high frequency rammer from 160 to 580 blows per minute. In some embodiments, the soil-clearing system includes at least one clearing rod, at least one auger section attached to the clearing rod, and an axially displaceable rail-mounted frame attached to the clearing rod, the rail-mounted frame including a hydraulic motor.

In some embodiments, the rail-mounted frame moves forward and backward along the longitudinal direction by means of at least one hydraulic cylinder acting between the rail-mounted frame and a locking system. In some embodiments, the soil-clearing system includes at least two clearing rods, each clearing rod having at least one auger section, the axially displaceable rail-mounted frame configured to extract dirt sequentially in a coordinated movement of the at least two clearing rods and auger sections. In some embodiments, the soil-clearing system includes an uninterrupted auger assembly driven by a hydraulic motor to drag dirt during operation.

In another aspect, the invention features a system for clearing soil from a section of pipe during underground installation. The system includes a main jacking frame including a surface for contacting the section of pipe. The system also includes a set of tracks coupled to the main jacking frame, the set of tracks permitting the main jacking frame to slide along a longitudinal direction. The system also includes a soil-clearing system having a base frame coupled to the set of tracks, the soil-clearing system configured to extract dirt from inside the section of pipe during underground installation of the section of pipe, the soil-clearing system moveable along the longitudinal direction independent of the main jacking frame and including at least one auger mounted in a frame coupled to the set of tracks that can move forward and backward along the longitudinal direction independently of the main jacking frame.

In another aspect, the invention features a method for clearing soil from a section of pipe during underground installation. The method includes extracting, using a soil clearing system coupled to a set of tracks, dirt from inside the section of pipe during installation of the section of pipe, the soil clearing system slideable over the set of tracks. The soil-clearing system includes at least one clearing rod, at least one auger section attached to the clearing rod, and an axially displaceable rail-mounted frame attached to the clearing rod, the rail-mounted frame including a hydraulic motor.

The foregoing may cover only some of the aspects of the invention. Other aspects may be appreciated by reference to the following description of at least one preferred mode for carrying out the invention in terms of one or more examples. The following embodiment of the invention is not a definition of the invention itself, but is only an example that embodies the inventive features of it.

BRIEF DESCRIPTION OF THE DRAWINGS

The accompanying drawings, which are incorporated in and constitute a part of the specification, illustrate one embodiment of the invention and together with the description, serve to explain the principles of this invention. In the drawings.

DETAILED DESCRIPTION

Figure 1:
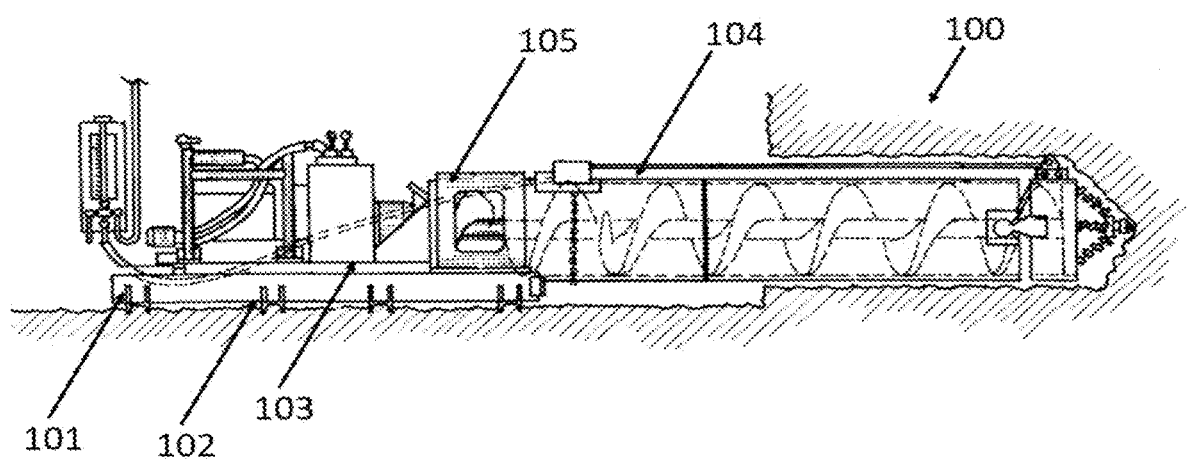
FIG. 1 is a side elevational view of a prior art method for auger boring showing a steel pipe being installed underground, while a set of augers are transmitting torque to a cutting head, at the same time they are clearing the dirt inside the casing.
Figure 2:
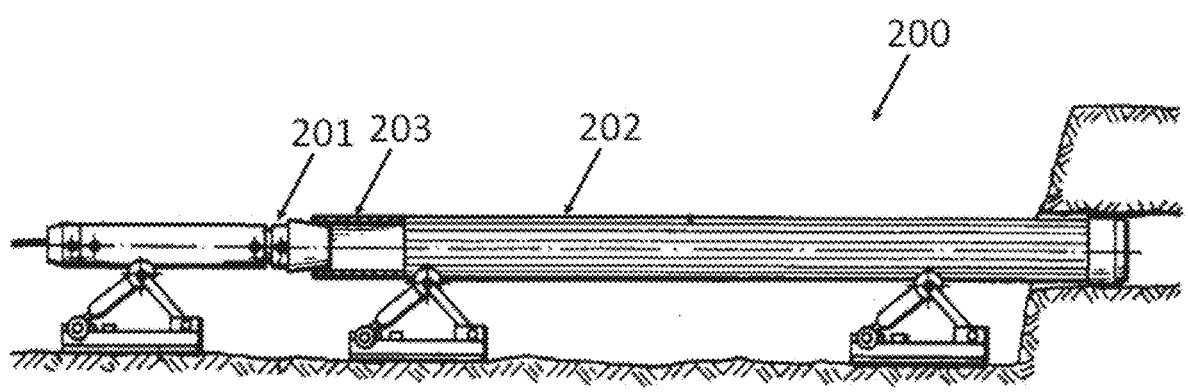
FIG. 2 is a side elevational view of a prior art method for pipe ramming showing a steel pipe being inserted underground.
Figure 3A:
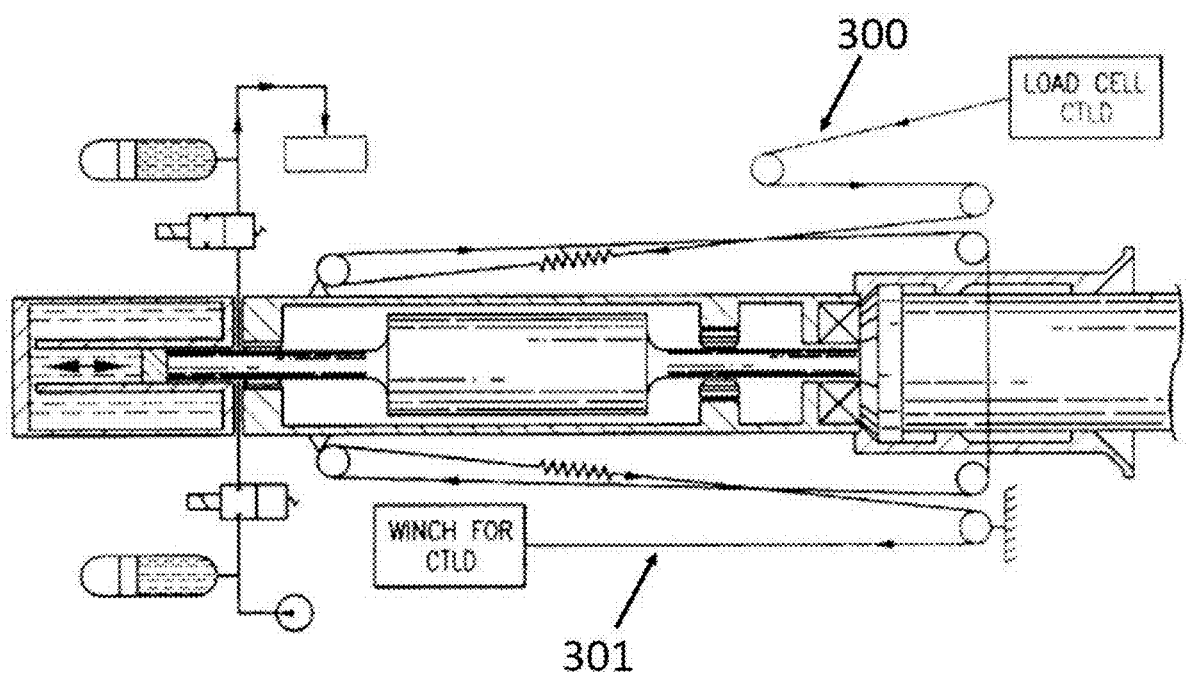
FIG. 3A is a top planar view of a prior art method for pipe ramming using a hydraulic hammer and a cable winch crowd system.
Figure 3B:
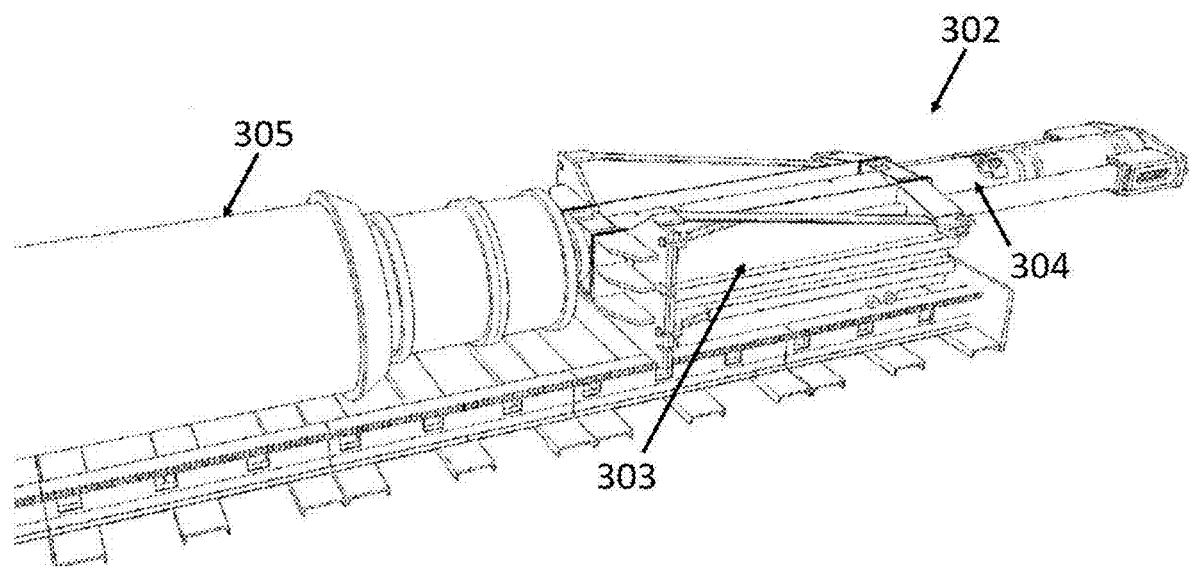
FIG. 3B is an isometric view of a prior art method for pipe ramming using a hydraulic hammer and a hydraulic crowd system.
Figure 4A:
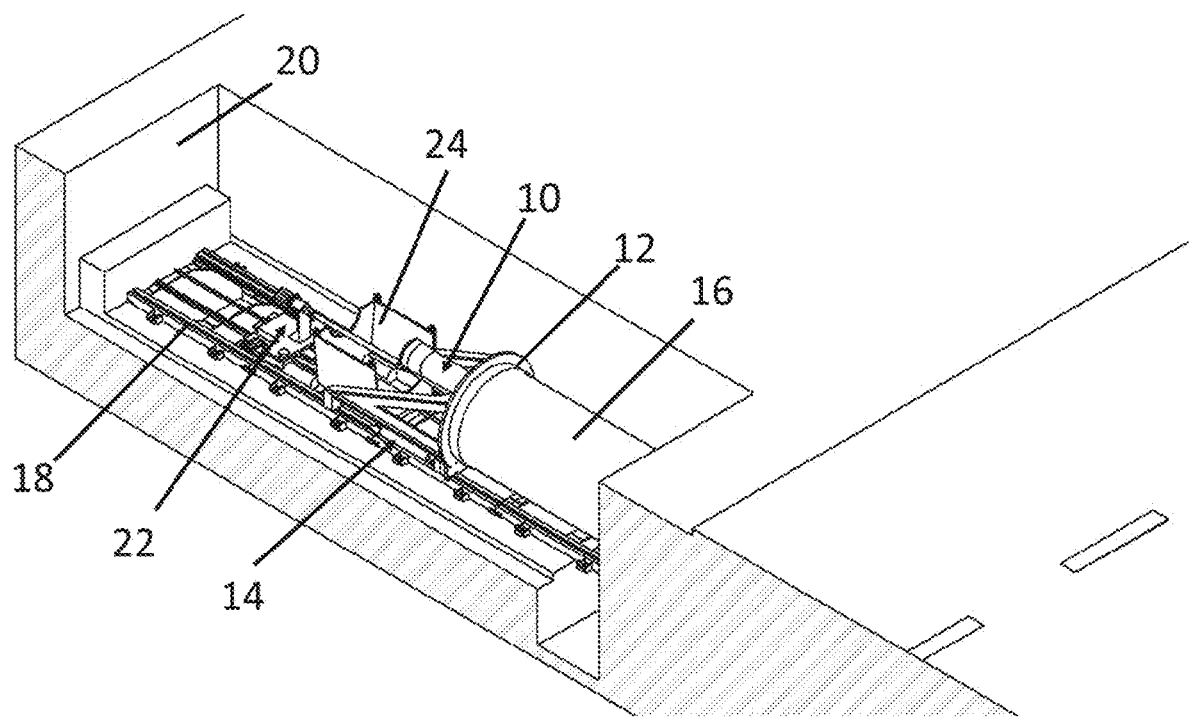
FIG. 4A is an isometric view and a side elevation view of a schematic diagram of a system for installing pipe underground, according to an illustrative embodiment of the invention.

As shown in FIG. 4A, the rammer 10 is used to generate a cyclical force (e.g., a series of percussive impacts) to a rail-mounted main jacking frame 12. The rammer 10 may be driven percussively by a pneumatic hammer or other high frequency driving apparatus, acting on the main jacking frame 12 using any suitable fitting device (not shown). The rammer 10 can be of the type manufactured by Hammerhead Trenchless Equipment, Model No. 12-(300)-AR. Other models of rammers could also be used. The jacking frame is assisted by a set of hydraulic jacks 14, which add hydraulic pushing force to the main jacking frame 12. The main jacking frame 12 has a surface for contacting the casing 16 and transmits the percussive force and the hydraulic force to the casing 16. The casing section 16 may be substituted by any product pipe able to resist and transmit the impact force generated by the rammer 10. The main jacking frame 12 is coupled and slides over the modular main tracks 18 which are assembled together to reach the desired stroke for the linear displacement of the main jacking frame 12, depending on the available space in the entry pit 20. During the pipe installation process, a soil-clearing system 22 (e.g., an independent, displaceable soil-clearing system) is used to clear the soil coming inside the casing section 16 while the installation progresses. The soil-clearing system 22 brings the excavated material to the entry pit 20 by dragging it through an open section or window in the main jacking frame 12, letting the material being collected into an optional bucket cart 24 attached to the main jacking frame 12. Once the bucket cart 24 is full of material, it can be removed from the main jacking frame 12 in order to dispose the material in a designated place on the surface. Alternatively, the spoils can be dropped in the entry pit without that optional bucket cart 24, to be collected later on manually or by means of an excavator machine.

Figure 4B:
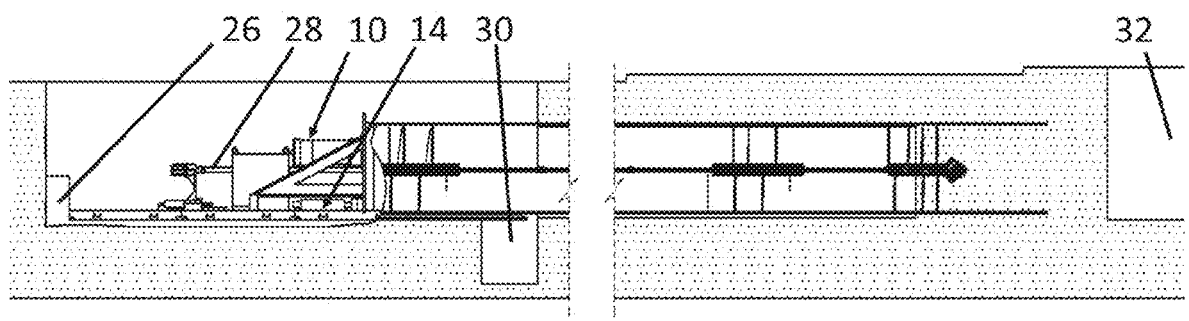
FIG. 4B is a side elevation view of a schematic diagram of a system for installing pipe underground, according to an illustrative embodiment of the invention.

FIG. 4B shows how the main tracks assembly is leaning on a support wall 26 for counteracting the reaction forces generated when jacking the casing sections 16 into the ground. Other types of anchoring methods could also be used to maintain the main tracks 18 fixed to the entry pit 20. Once one casing section 16 is installed, the last inserted clearing rod 28 is disengaged from the soil-clearing system 22, and both the soil-clearing system 22 and the main jacking frame 12 are retracted to their initial position in order to leave enough space to lay down another casing section 16. An optional welding trench 30 may be used to accommodate the welder man when welding between the two casing sections 16. Other methodologies may also be used to join the casing sections 16. The process is repeated until the first casing section 16 reaches the exit pit 32.

Figure 5A:
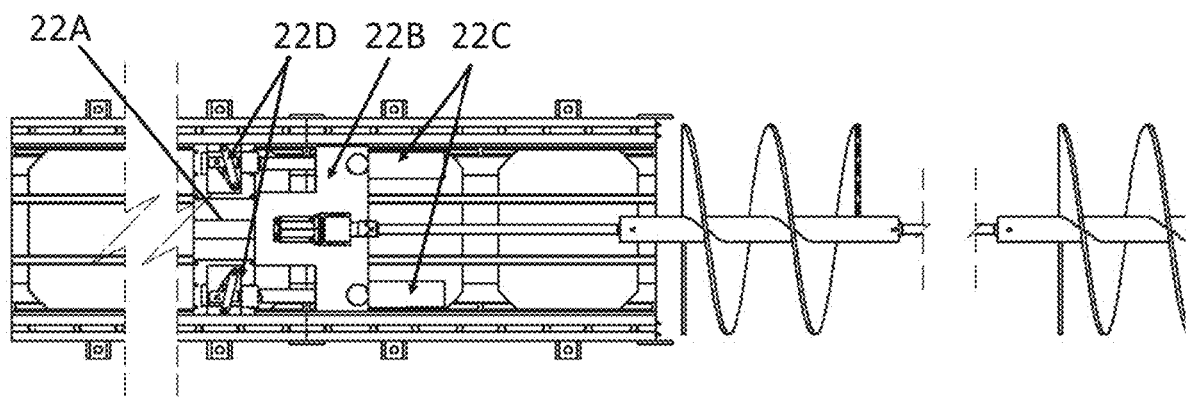
FIG. 5A is a top planar view of the details of an independent linear displaceable soil clearing system, according to an illustrative embodiment of the invention.
Figure 5B:
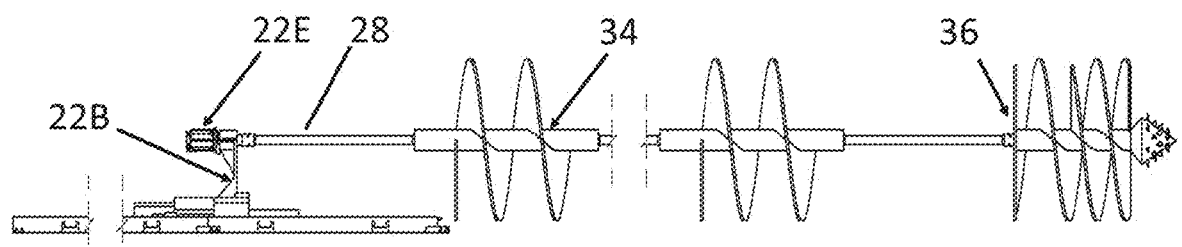
FIG. 5B is a side elevation view of the details of an independent linear displaceable soil clearing system, according to an illustrative embodiment of the invention.
Figure 6A:
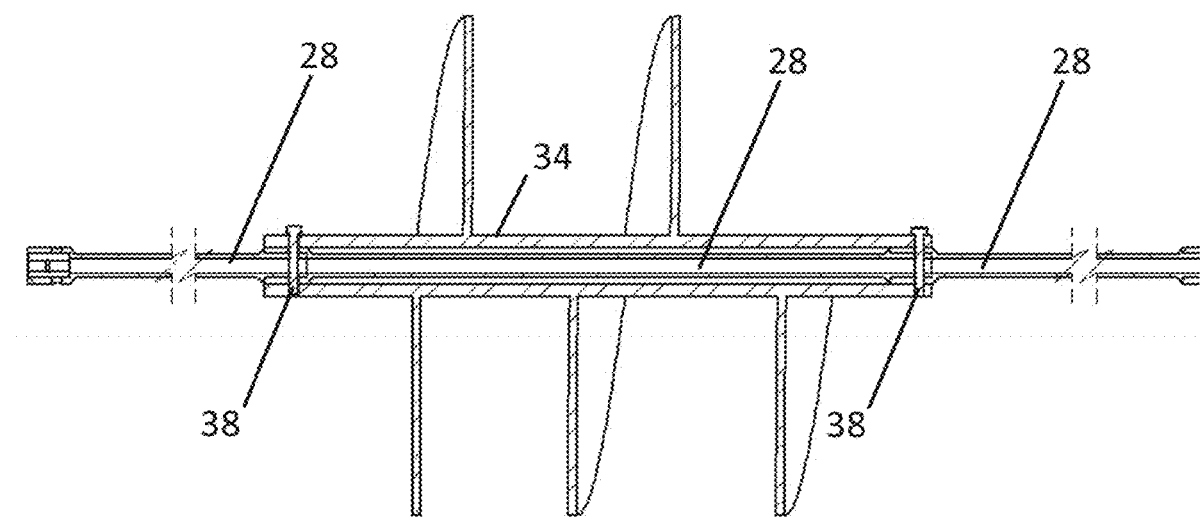
FIG. 6A is a side elevation view with a cross section showing details of the non-continuous auger assembly for the soil clearing system, according to an illustrative embodiment of the invention.

FIG. 5A and FIG. 5B expose the details of the soil-clearing system 22 which is a rail-mounted assembly of other subsystems explained as follows. A base frame 22A is used to support the whole soil-clearing system and it is able to slide over the main tracks 18 without interfering with the path of the jacking frame 12. The base frame 22A has short tracks attached in order to let slide over it top frame 22B. The relative linear displacement between base frame 22A and top frame 22B is generated by means of another set of supplementary hydraulic jacks 22C. In order to avoid relative movement between the base frame 22A and the main tracks 18, a supplementary self-anchoring system 22D is shown. However, the self-anchoring system can be substituted with any anchoring systems such as manual locking levers, hydraulic locks, electric solenoids, or other locking devices. The top frame 22B also includes a housing and a rotor mounted on taper roller bearings for supporting radial and axial forces. The rotor of the top frame 22B is attached to the shaft of a hydraulic motor 22E, which provides rotation to the soil-clearing system. As shown in FIG. 6A, the torque provided by hydraulic motor 22E and the push/pull force are transmitted through the detachable clearing rods 28. Each clearing rod 28 is provided with a male and a female connection and a hole in each connection in order to accommodate a pin 38 for locking the clearing rod 28 to the next one. A set of supplementary augers 34 can be progressively added to the clearing rods 28 assembly during the casing installation process. For drilling the compacted soil coming inside the first casing section 16, an auger bit 36 is installed in front of the first clearing rod 28.

Figure 6B:
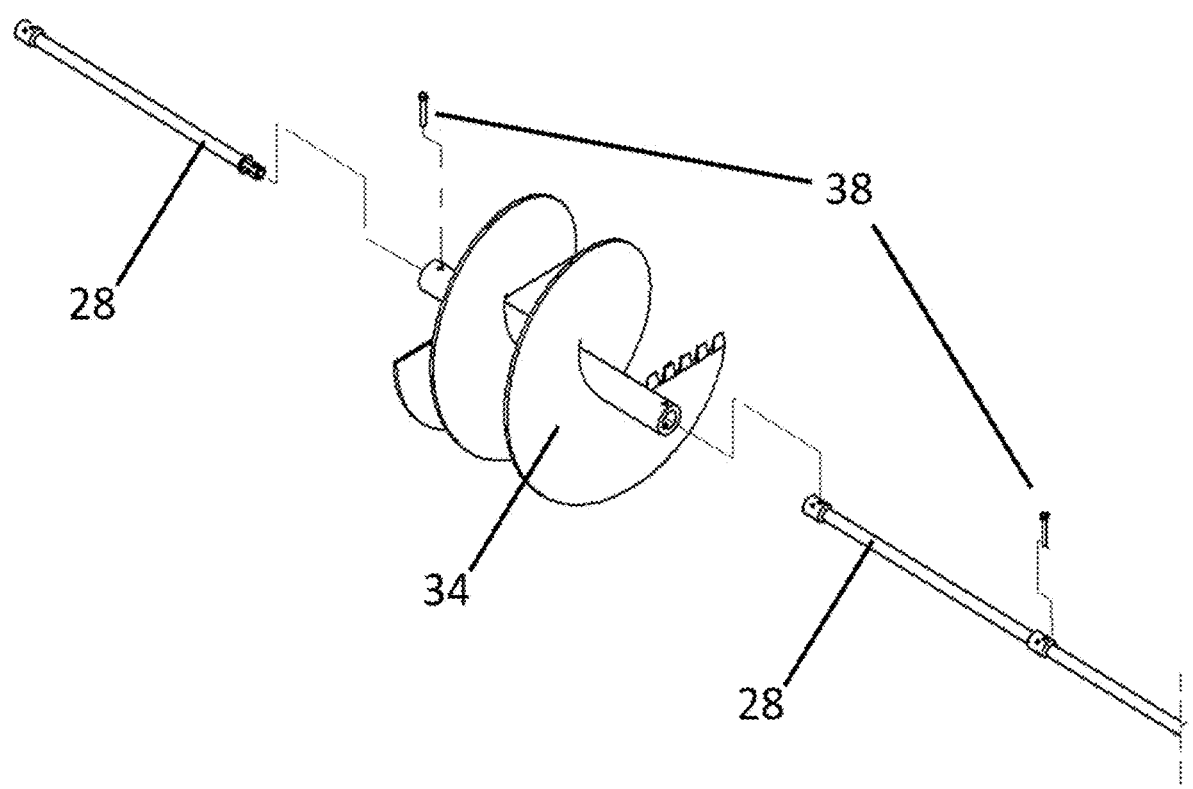
FIG. 6B is an isometric exploded view showing details of the non-continuous auger assembly for the soil clearing system, according to an illustrative embodiment of the invention.

FIG. 6A shows a cross section of a clearing rod 28—supplementary auger 34 assembly. As it is shown, the supplementary augers 34 have an annular space in order to accommodate inside it the clearing rod 28. Then the two pieces are joined together by the means of threaded pins 38. Other type locking methods could also be used to fix the two parts together. FIG. 6B exemplifies how the clearing rods 28 and the supplementary auger 34 are assembled using the threaded pins 38.

Figure 7A:
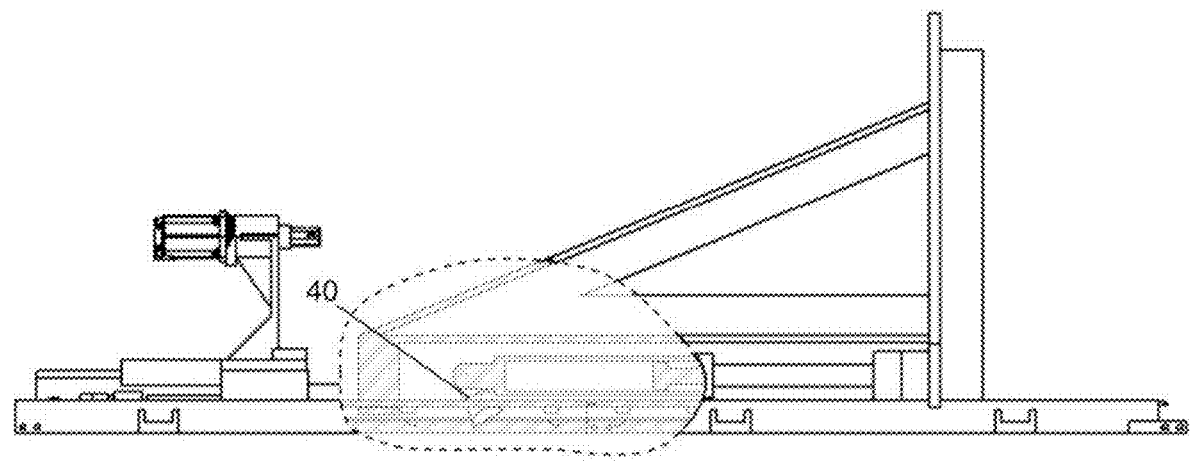
FIG. 7A is a side elevation view with a partial cross section showing details of a self-anchoring system for the hydraulic jacks of the main jacking frame, according to an illustrative embodiment of the invention.
Figure 7B:
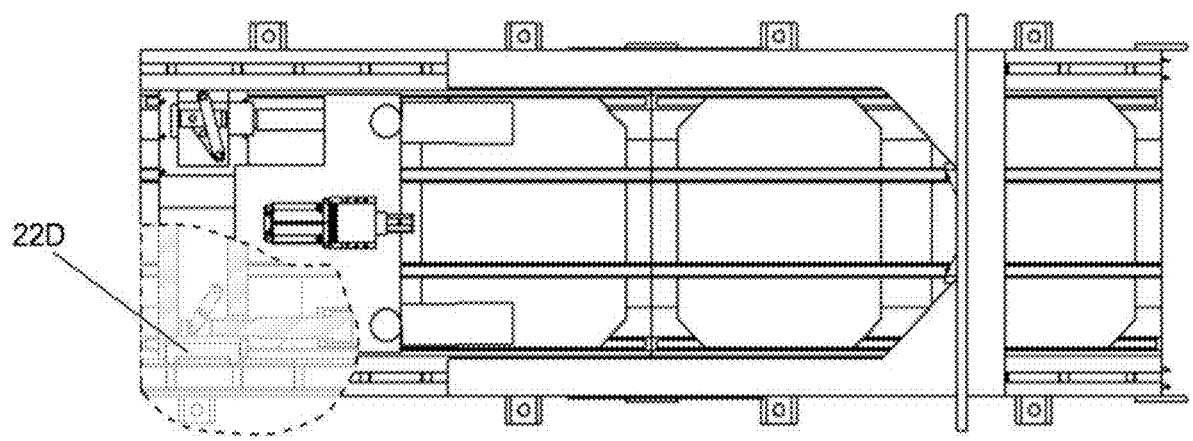
FIG. 7B is a top planar view with a partial cross section of the invention showing details of a self-anchoring system for the hydraulic jacks of the independent linear displaceable soil clearing system, according to an illustrative embodiment of the invention.

FIG. 7A shows a partial cross section of the main self-anchoring system 40 of the main jacking frame 12, in which the main hydraulic jacks 14 lean on to push or retract the main jacking frame 12. This component of the invention can be substituted with any anchoring systems such as manual locking levers, hydraulic locks, electric solenoids, or another locking component to provide a pushing point for the main hydraulic jacks 14. FIG. 7B also exposes a cross section of a detailed view for the supplementary self-anchoring system 22D explained above. In both self-anchoring systems, the operation mode is based on releasing the lock (also called dogs) from the main tracks 18, and then retract or expand the hydraulic jacks in order to shift to another anchoring point.

Another feature of this invention is the possibility to increase hydraulic power used to push the main jacking frame 12 when needed by relying on the supplementary hydraulic jacks 22C of the soil-clearing system 22. This is possible since the soil-clearing system 22 can move independently from the main jacking system.

Some embodiments of the present invention have been described above. It is recognized, however, that departures may be made therefrom and that obvious modifications could come to the mind of a person skilled in the art without departing from the scope of the invention.

What is claimed is:

1. A system for clearing soil from a section of pipe oriented substantially horizontally with respect to a ground plane during underground installation, the system comprising:
    a main jacking frame including a surface for contacting the section of pipe;
    a set of tracks coupled to the main jacking frame, the set of tracks permitting the main jacking frame to slide along a longitudinal direction; and
    a soil-clearing system having a base frame coupled to the set of tracks, the soil-clearing system configured to extract dirt from inside the section of pipe, the soil-clearing system moveable along the longitudinal direction independent of the main jacking frame during underground installation of the section of pipe and including a non-continuous auger assembly mounted in a frame coupled to the set of tracks that can move along the longitudinal direction independently of the main jacking frame, the auger assembly oriented substantially horizontally with respect to the ground plane and comprising at least a first auger section, a second auger section, and at least one augerless clearing rod disposed between the first auger section and the second auger section, the augerless clearing rod separable from the first auger section and the second auger section.

2. The system of claim 1 wherein a cutting head of the auger assembly has a diameter that is less than a diameter of the section of pipe.

3. The system of claim 1 wherein a cutting head of the auger assembly remains within the section of pipe during underground installation.

4. The system of claim 1 wherein the auger assembly comprises the at least one clearing rod disposed between the first auger section and the second auger section.

5. The system of claim 1 wherein the section of pipe has a diameter of 72 inches or less.

6. The system of claim 1 wherein the base frame of the soil-clearing system moves forward and backward along a longitudinal direction by means of at least one hydraulic cylinder acting between the base frame and a locking system.

7. The system of claim 1 further comprising a pneumatic rammer coupled to the main jacking frame and configured to provide a percussive force to the section of pipe.

8. The system of claim 7 further comprising one or more hydraulic jacks coupled to the main jacking frame and configured to provide a static hydraulic force to the section of pipe.

9. The system of claim 8 wherein the percussive force and the static hydraulic force combine to drive the section of pipe underground.

10. The system of claim 7 wherein the pneumatic rammer is a high frequency rammer from 160 to 580 blows per minute.

11. The system of claim 1 wherein the main jacking frame includes a pusher plate having at least one window to permit passage of dirt extracted by the soil-clearing system.

12. A method for clearing soil from a section of pipe oriented substantially horizontally with respect to a ground plane during underground installation, the method comprising:
    rotating a non-continuous auger assembly oriented substantially horizontally with respect to the ground plane and comprising at least a first auger section, a second auger section, and at least one augerless clearing rod disposed between the first auger section and the second auger section, the auger assembly attached to an axially displaceable rail-mounted frame slideable over a set of tracks, the set of tracks coupled to a main jacking frame, the augerless clearing rod separable from the first auger section and the second auger section; and displacing longitudinally the rail-mounted frame to remove soil from the section of pipe during underground installation, the rail-mounted frame independently moveable with respect to the main jacking frame, the main jacking frame independently driving the section of pipe underground.

13. The method of claim 12 wherein the auger assembly comprises the at least one clearing rod disposed between the first auger section and the second auger section.

14. The method of claim 12 wherein a cutting head of the auger assembly remains within the section of pipe during underground installation.

15. The method of claim 12 wherein a cutting head of the auger assembly has a diameter that is less than a diameter of the section of pipe.

16. The method of claim 12 wherein the section of pipe has a diameter of 72 inches or less.

17. The method of claim 12 wherein the railed-mounted frame moves forward and backward along a longitudinal direction by means of at least one hydraulic cylinder acting between the rail-mounted frame and a locking system.

18. The method of claim 12 further comprising removing the soil through an open section in the main jacking frame.

19. A system for clearing soil from a section of pipe during underground installation, the system comprising:

a main jacking frame including a surface for contacting the section of pipe;

a set of tracks coupled to the main jacking frame, the set of tracks permitting the main jacking frame to slide along a longitudinal direction;

a soil-clearing system having a base frame coupled to the set of tracks, the soil-clearing system configured to extract dirt from inside the section of pipe, the soil-clearing system moveable along the longitudinal direction independent of the main jacking frame during underground installation of the section of pipe and including a non-continuous auger assembly mounted in a frame coupled to the set of tracks that can move along the longitudinal direction independently of the main jacking frame, the auger assembly comprising at least a first auger section, a second auger section, and at least one augerless clearing rod disposed between the first auger section and the second auger section, the augerless clearing rod separable from the first auger section and the second auger section;

a pneumatic rammer coupled to the main jacking frame and configured to provide a percussive force to the section of pipe; and one or more hydraulic jacks coupled to the main jacking frame and configured to provide a static hydraulic force to the section of pipe.

20. The system of claim 19 wherein the percussive force and the static hydraulic force combine to drive the section of pipe underground.

* * * * *